US008061968B2

(12) United States Patent
Merry et al.

(10) Patent No.: US 8,061,968 B2
(45) Date of Patent: Nov. 22, 2011

(54) COUNTER-ROTATING COMPRESSOR CASE AND ASSEMBLY METHOD FOR TIP TURBINE ENGINE

(75) Inventors: Brian Merry, Andover, CT (US); Gabriel L. Suciu, Glastonbury, CT (US); James W. Norris, Lebanon, CT (US); Craig A. Nordeen, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1079 days.

(21) Appl. No.: 11/719,892

(22) PCT Filed: Dec. 1, 2004

(86) PCT No.: PCT/US2004/039971
§ 371 (c)(1),
(2), (4) Date: May 22, 2007

(87) PCT Pub. No.: WO2006/059969
PCT Pub. Date: Jun. 8, 2006

(65) Prior Publication Data
US 2009/0162187 A1    Jun. 25, 2009

(51) Int. Cl.
*F01D 1/24*    (2006.01)
(52) U.S. Cl. .......................... 415/68; 415/69; 60/39.43
(58) Field of Classification Search .................. 415/68, 415/69, 64, 62; 60/39.43, 268, 39.162, 226.1
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |

(Continued)

FOREIGN PATENT DOCUMENTS

DE    767 704 C    5/1953

(Continued)

OTHER PUBLICATIONS

European Office Action for EP Application No. 04822094.1, Mar. 18, 2010.

*Primary Examiner* — Edward Look
*Assistant Examiner* — Dwayne J White
(74) *Attorney, Agent, or Firm* — Carlson, Gaskey & Olds, PC

(57) ABSTRACT

A tip turbine engine (10) provides an axial compressor (22) having a compressor case (50) from which extend radially inwardly a plurality of outer compressor airfoils (54). The compressor case (50) is directly driven by the rotation of the turbine (32) and fan (28), while at least one gear (77) couples the rotation of the turbine (32) and fan (28) to an axial compressor rotor (46) having a plurality of inner compressor airfoils (52). In this manner, the axial compressor rotor (46) is driven in a direction opposite the direction of the outer compressor airfoils (54), thereby increasing the compression provided by the compressor without increasing the number of airfoils. The outer compressor airfoils (54) are formed on a plurality of outer airfoil assemblies (56) each having an arcuate substrate (58) from which the outer compressor airfoils (54) extend. Each of the outer compressor airfoil assemblies (56) includes more than one axially-spaced stage of outer compressor airfoils (54). For assembly, the outer compressor airfoil assemblies (56) are moved toward the axial compressor rotor (46) and then inserted into the compressor case (50).

17 Claims, 3 Drawing Sheets

U.S. PATENT DOCUMENTS

| | | |
|---|---|---|
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Liston et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| DE | 1173292 | 7/1964 |
| EP | 0475771 | 3/1992 |
| EP | 1 340 902 A1 | 9/2003 |
| GB | 1287223 | 8/1972 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006/059968 | 6/2006 |
| WO | 2006/059969 | 6/2006 |
| WO | 2006/059972 | 6/2006 |
| WO | 2006/059973 | 6/2006 |
| WO | 2006/059974 | 6/2006 |
| WO | 2006/059975 | 6/2006 |
| WO | 2006/059976 | 6/2006 |
| WO | 2006/059977 | 6/2006 |
| WO | 2006/059978 | 6/2006 |
| WO | 2006/059979 | 6/2006 |
| WO | 2006/059980 | 6/2006 |
| WO | 2006/059981 | 6/2006 |
| WO | 2006/059982 | 6/2006 |
| WO | 2006/059985 | 6/2006 |
| WO | 2006/059986 | 6/2006 |
| WO | 2006/059987 | 6/2006 |
| WO | 2006/059988 | 6/2006 |
| WO | 2006/059989 | 6/2006 |
| WO | 2006/059990 | 6/2006 |
| WO | 2006/059991 | 6/2006 |
| WO | 2006/059992 | 6/2006 |
| WO | 2006/059993 | 6/2006 |
| WO | 2006/059994 | 6/2006 |
| WO | 2006/059995 | 6/2006 |
| WO | 2006/059996 | 6/2006 |
| WO | 2006/059999 | 6/2006 |
| WO | 2006/060000 | 6/2006 |
| WO | 2006/060001 | 6/2006 |
| WO | 2006/060002 | 6/2006 |
| WO | 2006/060004 | 6/2006 |
| WO | 2006/060005 | 6/2006 |

| | | | | | | |
|---|---|---|---|---|---|---|
| WO | 2006/060006 | 6/2006 | | WO | 2006059985 | 6/2006 |
| WO | 2006/060009 | 6/2006 | | WO | 2006/059971 | 8/2006 |
| WO | 2006/060010 | 6/2006 | | WO | 2006/059970 | 10/2006 |
| WO | 2006/060011 | 6/2006 | | WO | 2006/110122 | 10/2006 |
| WO | 2006/060012 | 6/2006 | | WO | 2006059970 | 10/2006 |
| WO | 2006/060013 | 6/2006 | | WO | 2006/059997 | 11/2006 |
| WO | 2006/060014 | 6/2006 | | WO | 2006/110124 | 11/2006 |
| WO | 2006/062497 | 6/2006 | | WO | 2006/110123 | 12/2006 |
| WO | 2006059968 | 6/2006 | | WO | 2006/112807 | 12/2006 |
| WO | 2006059969 | 6/2006 | | WO | 2006/110125 | 2/2007 |
| WO | 2006059980 | 6/2006 | | WO | 2006/060003 | 3/2007 |

COUNTER-ROTATING COMPRESSOR CASE AND ASSEMBLY METHOD FOR TIP TURBINE ENGINE

BACKGROUND OF THE INVENTION

The present invention relates to turbine engines, and more particularly to a rotating case for an axial compressor for a tip turbine engine.

An aircraft gas turbine engine of the conventional turbofan type generally includes a forward bypass fan, a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines include hollow fan blades that receive core airflow therethrough such that the hollow fan blades operate as a centrifugal compressor. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

In the known tip turbine engine designs, an axial compressor rotor is directly driven by rotation of the hollow fan blades. The axial compressor rotor includes one or more stages of radially-extending compressor blades each of which followed by a stage of static compressor vanes extending radially inwardly from a compressor case. Increasing the number of stages of compressor blades and compressor vanes increases the compression of the core airflow and the efficiency of the engine, but increases the overall length and weight of the engine and the number of parts.

SUMMARY OF THE INVENTION

Although the present invention would also be useful in conventional gas turbine engines and geared turbine engines, it will be described as incorporated in a tip turbine engine for illustration. A tip turbine engine according to the present invention provides an axial compressor having a compressor case from which extend radially inwardly a plurality of outer compressor airfoils. The compressor case is directly driven by the rotation of the turbine and fan, while at least one gear couples the rotation of the turbine and fan to an axial compressor rotor from which extend radially outwardly a plurality of inner compressor airfoils. In this manner, the axial compressor rotor is driven in a rotational direction opposite the direction of the outer compressor airfoils, thereby increasing the compression provided by the compressor without increasing the number of airfoils. Additionally, because the inner compressor airfoils are driven in a direction opposite that of the fan, a stage of outer compressor airfoils between the last stage of inner compressor airfoils and the inlet to the hollow fan blades can be eliminated.

The outer compressor airfoils are formed on an outer airfoil assembly having an arcuate substrate from which the outer compressor airfoils extend. In the preferred embodiment, the outer compressor airfoils are formed on two such outer airfoil assemblies, each extending half way around an axis of the compressor. Additionally, each of the outer compressor airfoil assemblies includes more than one axially-spaced stage of outer compressor airfoils. During assembly, the outer compressor assemblies are placed on the compressor rotor prior to inserting the rotor and outer compressor assemblies into the compressor case, so that the multiple stages of outer and inner compressor airfoils can be placed in an alternating arrangement. The outer compressor assemblies are then mounted to the interior of the compressor case, such that the outer compressor assemblies rotate with the compressor case.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
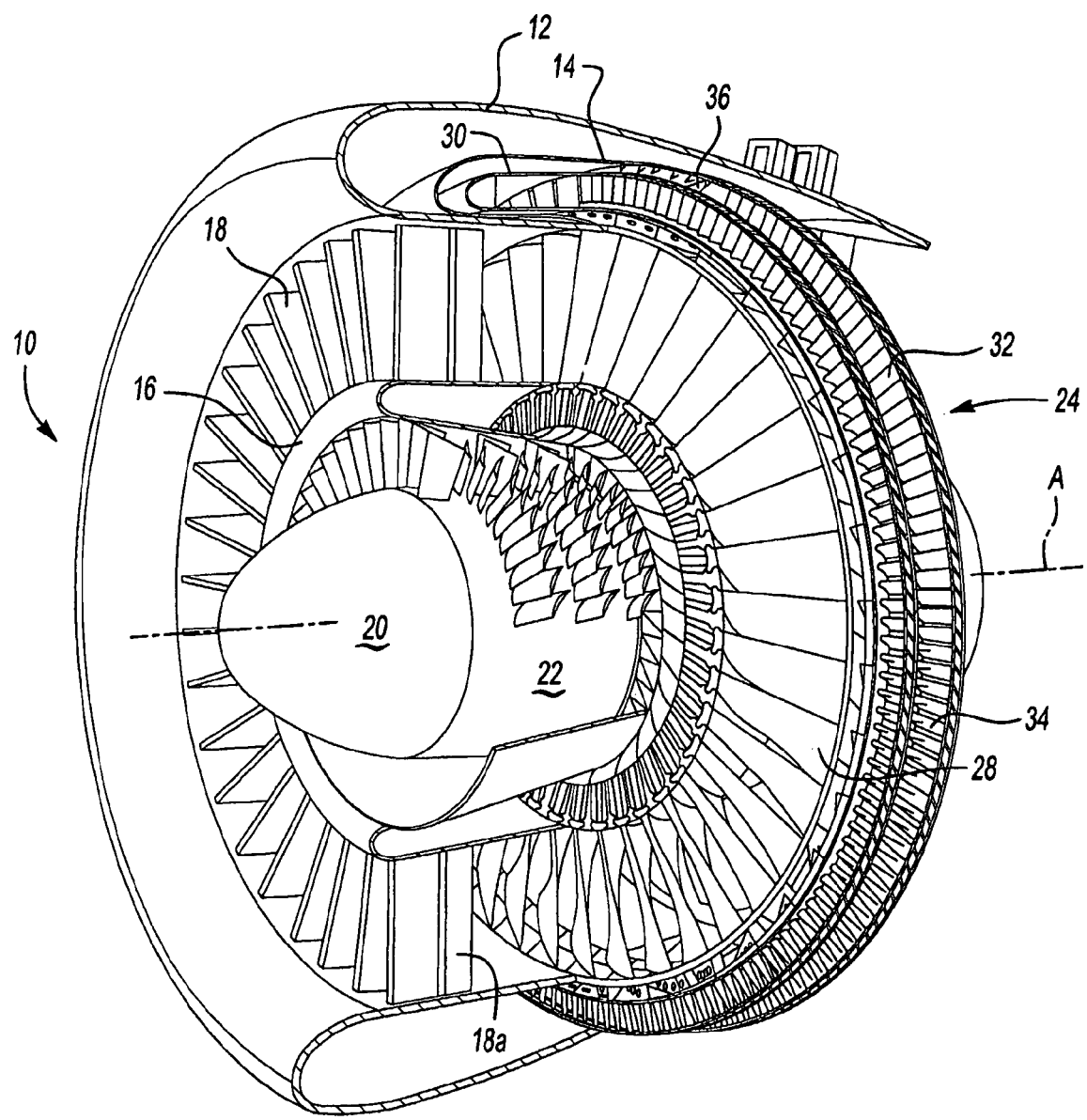
FIG. 1 is a partial sectional perspective view of a tip turbine engine according to the present invention.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18A.

A nosecone 20 is preferably located along the engine centerline A to improve airflow into an axial compressor 22, which is mounted about the engine centerline A behind the nosecone 20. Note that some details of the axial compressor 22 discussed below with respect to FIGS. 2 and 3 are omitted in FIG. 1, but FIG. 1 illustrates the general arrangement of the components.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32.

Figure 2:
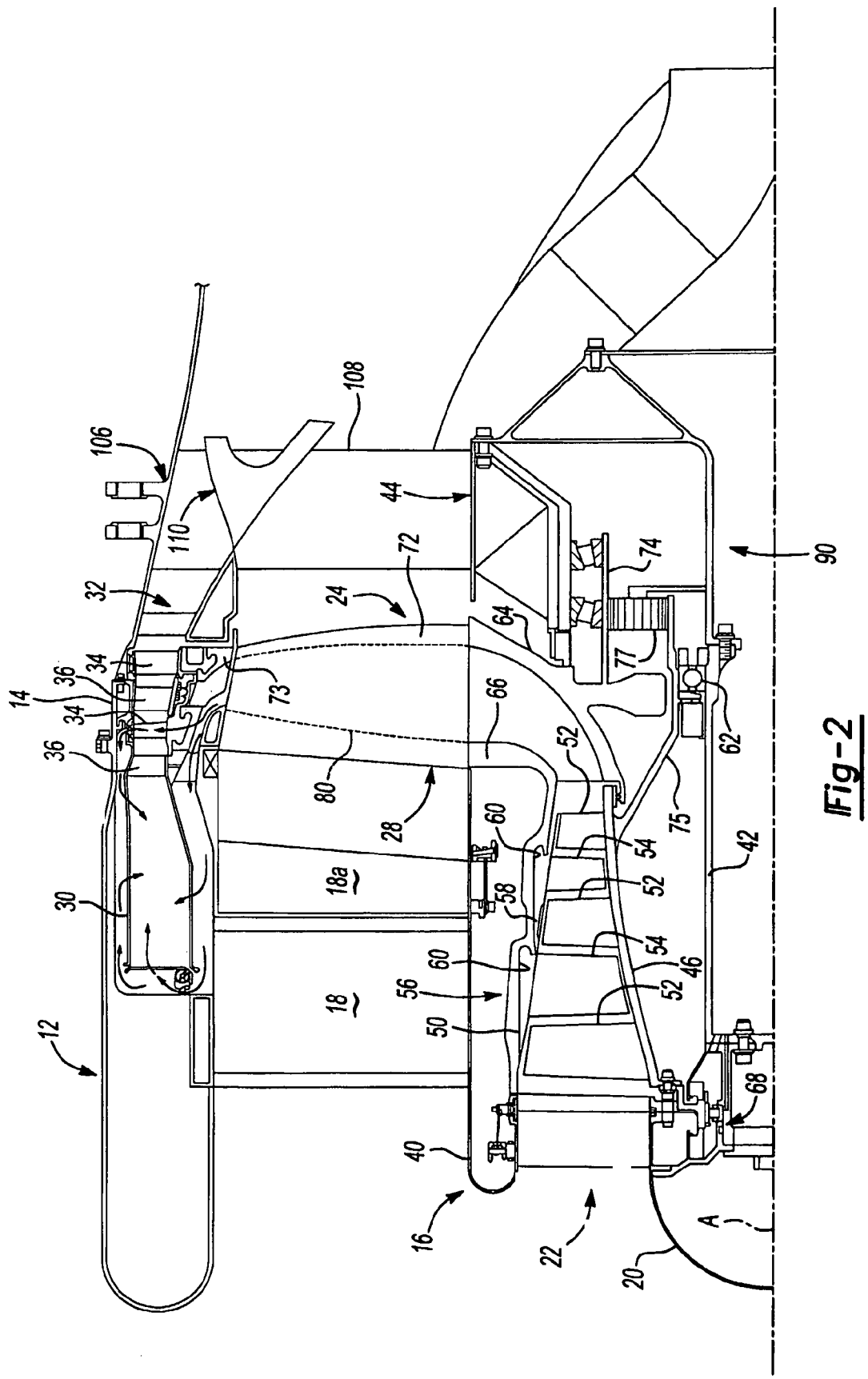
FIG. 2 is a longitudinal sectional view of the tip turbine engine of FIG. 1 taken along an engine centerline.
Figure 3:
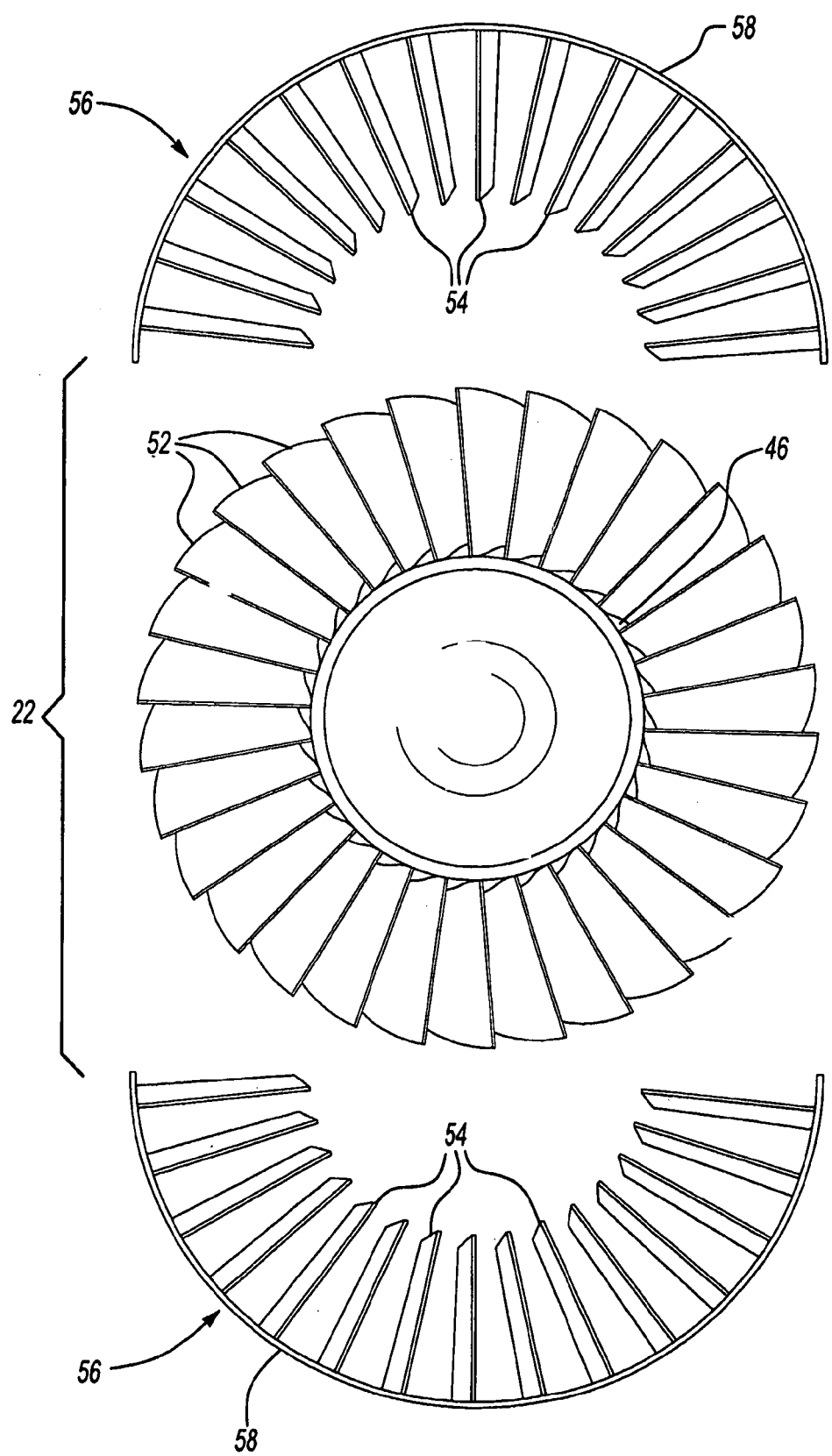
FIG. 3 is an exploded end view of the axial compressor of FIGS. 1 and 2.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, from which a plurality of inner compressor airfoils 52 extend radially outwardly, and a compressor case 50 rotatable within the splitter 40 and fixed to rotate with the fan hub 64. A plurality of outer compressor airfoils 54 extend radially inwardly between stages of the inner compressor airfoils 52. The inner compressor airfoils 52 and outer compressor airfoils 54 are arranged circumferentially about the axial compressor rotor 46 in stages (three stages of inner compressor airfoils 52 and two stages of outer compressor airfoils 54 are shown in this example). The axial compressor rotor 46 is mounted for rotation upon the static inner support housing 42 through a forward bearing assembly 68 and an aft bearing assembly 62.

The outer compressor airfoils 54 are part of an outer compressor airfoil assembly 56. The outer compressor airfoil assembly 56 includes an arcuate substrate 58 that extends partially (in this example half way) about the engine centerline A. The outer compressor airfoils 54 extend radially inwardly from the arcuate substrate 58 and in the preferred embodiment are integrally formed with the arcuate substrate 58 such as by being integrally cast or machined from the same material. The outer compressor airfoils 54 include a plurality (in this example, two) of axially-spaced stages, such that the stages of outer compressor airfoils 54 alternate with the stages of inner compressor airfoils 52, as shown. The arcuate substrate 58 is received within two annular pockets 60 formed on the interior surface of the compressor case 50.

The fan-turbine rotor assembly 24 includes a fan hub 64 that supports a plurality of the hollow fan blades 28. Each fan blade 28 includes an inducer section 66, a hollow fan blade section 72 and a diffuser section 73. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 which acts as a compressor chamber where the airflow is centrifugally compressed. From the core airflow passage 80, the airflow is diffused and turned once again toward an axial airflow direction toward the annular combustor 30. Preferably, the airflow is diffused axially forward in the engine 10, however, the airflow may alternatively be communicated in another direction.

A fan shaft 74 extends rearwardly from the fan hub 64 radially outward of a compressor shaft 75 extending rearwardly from the axial compressor rotor 46. A plurality of idler gears 77 (one shown) couple the fan shaft 74 to the compressor shaft 75. In this manner, rotation of the turbine 34, fan blades 28 and fan shaft 74 imparts counter-rotation in the compressor shaft 75 and axial compressor rotor 46.

Although the specific angles will depend on a variety of factors, including anticipated blade velocities and the design choices made in the earlier stages of the inner compressor airfoils 52, two general benefits are provided by counter-rotation (i.e. counter to the direction of rotation of the fan turbine rotor assembly 24) of the inner compressor airfoils 52. First, there is no need for a stage of non-rotating compressor vanes between the last stage of inner compressor airfoils 52 and the inducer sections 66, since compression is provided between the counter-rotation of the inner compressor airfoils 52 and inducer sections 66 which would not be provided by adjacent, co-rotating components. This reduces the overall length and weight of the engine 10 and the number of parts in the engine 10. Second, the absolute velocity vector of the core airflow into the inducer sections 66 has a component that is opposite the blade velocity vector, which would not exist in a co-rotating arrangement with a compressor vane between the inner compressor airfoils 52 and the inducer section 66. As a result, the angle of the leading edge 114 of the inducer section 66 relative the engine centerline A is significantly increased, thereby shortening the axial length of the inducer (since it requires a certain absolute length, in order to turn the core airflow from axial flow to radial flow), and decreasing the overall length of the engine 10.

Additionally, compressor disks are eliminated because of the reduced speed compared to a geared high speed axial compressor, while the same pressure is achieved. The gearbox horsepower is reduced by over 50% since only half the blades are being driven through the gearbox at a slower speed than the direct fan driven blades. A seal between the compressor case 50 and the fan hub 64 is no longer required and any leakage is eliminated. The slower rotation speed also permits slower bearings and seals.

FIG. 3 is an exploded end view of the axial compressor 22. The axial compressor 22 includes two outer compressor airfoil assemblies 56. For assembly, the two outer compressor airfoil assemblies 56 are moved toward the axial compressor rotor 46 with the outer compressor airfoils 54 aligned to be axially alternating with the inner compressor airfoils 52 (note that only the first stage of the outer compressor airfoils 54 and the inner compressor airfoils 52 are visible in FIG. 3, but the stages would alternate as shown in FIG. 2). The two outer compressor airfoil assemblies 56 and axial compressor rotor 46 are then inserted into the compressor case 50 as shown in FIG. 2, with the arcuate substrates 58 received in the annular pockets 60 on the interior surface of the compressor case 50.

In operation, core airflow enters the axial compressor 22, where it is compressed by the rotating outer compressor airfoils 54 and counter-rotating inner compressor airfoils 52. The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 into the annular combustor 30. The compressed core airflow from the hollow fan blades 28 is mixed with fuel in the annular combustor 30 and ignited to form a high-energy gas stream.

The high-energy gas stream is expanded over the plurality of tip turbine blades 34 mounted about the outer periphery of the fan-turbine rotor assembly 24 to drive the fan-turbine rotor assembly 24, which in turn rotatably drives the compressor case 50 and outer compressor airfoils 54, while counter-rotatably driving the axial compressor rotor 46 and inner compressor airfoils 54 via the idler gears 77.

The fan-turbine rotor assembly 24 discharges fan bypass air axially aft to merge with the core airflow from the turbine 32 in an exhaust case 106. A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the turbine blades 34 with the bypass airflow through the fan blades 28.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A turbine engine comprising:
    a fan having a plurality of fan blades, at least one of the fan blades including a compressor chamber extending radially therein;
    a turbine including a plurality of turbine blades and coupled to outer portions of the fan blades;
    a plurality of first compressor airfoils rotatably driven by the turbine in a first rotational direction; and
    a plurality of second compressor airfoils rotatably driven by the turbine in a second rotational direction opposite the first rotational direction.

2. The turbine engine of claim 1 further including at least one gear coupling the plurality of second compressor airfoils to the turbine, such that the plurality of second compressor airfoils is counter-rotatably driven by the turbine.

3. The turbine engine of claim 1 further including a compressor case from which the plurality of first compressor airfoils extends radially inwardly.

4. The turbine engine of claim 3 further including a compressor rotor from which the plurality of second compressor airfoils extends radially outwardly.

5. The turbine engine of claim 4 wherein the compressor case is driven directly by the fan blades.

6. The turbine engine of claim 1 wherein the plurality of first compressor airfoils is directly driven by the turbine.

7. The turbine engine of claim 1 wherein the plurality of first compressor airfoils extends from a plurality of arcuate sections, the arcuate sections disposed about the axis.

8. The turbine engine of claim 7 wherein the plurality of first compressor airfoils includes a plurality of axially-spaced stages of compressor airfoils.

9. The turbine engine of claim 8 wherein at least one of the plurality of arcuate sections includes portions of more than one of the plurality of axially-spaced stages of compressor airfoils.

10. The turbine engine of claim 9 wherein the plurality of arcuate sections is two arcuate sections.

11. A turbine engine comprising:
    a turbine rotatable about an axis, the turbine including a plurality of turbine blades;
    a fan having a plurality of fan blades rotatably driven by the turbine, wherein the turbine blades are mounted at radially outer ends of the fan blades;
    a compressor case driven directly by the fan blades, a plurality of first compressor airfoils extending radially inwardly from the compressor case and rotatably driven by the turbine in a first rotational direction;
    a compressor rotor having a plurality of second compressor airfoils extending radially outwardly therefrom, the plurality of second compressor airfoils rotatably driven by the turbine in a second rotational direction opposite the first rotational direction; and
    at least one gear coupling the plurality of second compressor airfoils to the turbine, such that the plurality of second compressor airfoils is counter-rotatably driven by the turbine.

12. The turbine engine of claim 11 wherein the first plurality of compressor airfoils is directly driven by the turbine.

13. A turbine engine comprising:
    a turbine rotatable about an axis, the turbine including a plurality of turbine blades;
    a plurality of first compressor airfoils rotatably driven by the turbine in a first rotational direction;
    a plurality of second compressor airfoils rotatably driven by the turbine in a second rotational direction opposite the first rotational direction; and
    at least one gear coupling the plurality of second compressor airfoils to the turbine, such that the plurality of second compressor airfoils is counter-rotatably driven by the turbine, wherein the first plurality of compressor airfoils extend from a plurality of distinct arcuate sections, the arcuate sections disposed about the axis.

14. The turbine engine of claim 13 wherein the first plurality of compressor airfoils includes a plurality of axially-spaced stages of compressor airfoils.

15. The turbine engine of claim 14 wherein at least one of the plurality of arcuate sections includes portions of more than one of the plurality of axially-spaced stages of compressor airfoils.

16. The turbine engine of claim 15 wherein the plurality of arcuate sections is two arcuate sections.

17. The turbine engine of claim 13 further including a fan having a plurality of fan blades rotatably driven by the turbine, wherein the turbine blades are mounted at radially outer ends of the fan blades.

\* \* \* \* \*